(12) United States Patent
Hirade et al.

(10) Patent No.: US 10,779,121 B2
(45) Date of Patent: Sep. 15, 2020

(54) INFORMATION PROCESSING APPARATUS AND NON-TRANSITORY COMPUTER READABLE MEDIUM FOR RECEIVING BEACON SIGNALS AND POSITION INFORMATION

(71) Applicant: FUJI XEROX CO., LTD., Tokyo (JP)

(72) Inventors: Satoshi Hirade, Kanagawa (JP); Jiro Matsuda, Kanagawa (JP); Takahiro Saito, Kanagawa (JP); Tohru Fuse, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 193 days.

(21) Appl. No.: 15/449,292

(22) Filed: Mar. 3, 2017

(65) Prior Publication Data

US 2018/0041873 A1    Feb. 8, 2018

(30) Foreign Application Priority Data

Aug. 8, 2016    (JP) .................................. 2016-155906

(51) Int. Cl.
*H04W 4/33*    (2018.01)
*H04W 4/02*    (2018.01)
(Continued)

(52) U.S. Cl.
CPC .......... *H04W 4/027* (2013.01); *H04W 4/021* (2013.01); *H04W 4/33* (2018.02); *H04W 4/026* (2013.01); *H04W 4/80* (2018.02)

(58) Field of Classification Search
CPC .......... H04L 9/00; H04L 29/06; H04W 48/16; H04W 64/00; H04W 4/00; H04R 3/12
See application file for complete search history.

(56) References Cited

U.S. PATENT DOCUMENTS

| 9,781,570 B2 * | 10/2017 | Cho ....................... H04W 4/027 |
| 2005/0068934 A1 * | 3/2005 | Sakoda ................. H04W 48/08 370/350 |

(Continued)

FOREIGN PATENT DOCUMENTS

| CN | 103826199 A | 5/2014 |
| JP | 4833620 B2 | 12/2011 |

(Continued)

OTHER PUBLICATIONS

May 26, 2020 Office Action issued on Japanese Patent Application No. 2016-155906.

(Continued)

*Primary Examiner* — Aftab N. Khan
(74) *Attorney, Agent, or Firm* — Oliff PLC

(57) ABSTRACT

An information processing apparatus includes an acquisition unit, a memory, and a setting unit. The acquisition unit acquires position information indicating a position of the information processing apparatus by performing communication with an external apparatus at a set time interval. The memory stores information about time intervals for respective regions. The setting unit changes and sets the time interval at which the acquisition unit performs communication to a time interval among the time intervals that is acquired by referring to content of the memory and that corresponds to a region corresponding to the position information among the regions.

3 Claims, 9 Drawing Sheets

(51) Int. Cl.
*H04W 4/021* (2018.01)
*H04W 4/80* (2018.01)

(56) References Cited

U.S. PATENT DOCUMENTS

| | | | | |
|---|---|---|---|---|
| 2005/0243782 A1* | 11/2005 | Sakoda | | H04L 47/10 |
| | | | | 370/338 |
| 2005/0286466 A1* | 12/2005 | Tagg | | H04L 12/2856 |
| | | | | 370/329 |
| 2006/0059096 A1* | 3/2006 | Dublish | | G06F 21/10 |
| | | | | 705/57 |
| 2006/0274743 A1* | 12/2006 | Yegin | | H04L 29/12113 |
| | | | | 370/389 |
| 2007/0249366 A1* | 10/2007 | Thomson | | H04W 4/029 |
| | | | | 455/456.1 |
| 2010/0226299 A1* | 9/2010 | Sumida | | H04W 52/0229 |
| | | | | 370/311 |
| 2011/0177831 A1* | 7/2011 | Huang | | H04W 64/003 |
| | | | | 455/457 |
| 2014/0200027 A1* | 7/2014 | Kim | | G01S 1/70 |
| | | | | 455/456.1 |
| 2015/0105099 A1* | 4/2015 | Luo | | H04W 64/003 |
| | | | | 455/456.1 |
| 2015/0312719 A1* | 10/2015 | Cho | | H04W 4/027 |
| | | | | 455/456.5 |
| 2016/0323754 A1* | 11/2016 | Friday | | H04W 16/28 |
| 2016/0323812 A1* | 11/2016 | Moon | | H04W 48/10 |
| 2017/0048618 A1* | 2/2017 | Shinotsuka | | G06F 3/165 |
| 2017/0118235 A1* | 4/2017 | Kang | | H04L 63/1425 |
| 2018/0020422 A1* | 1/2018 | Ichikawa | | H04W 40/244 |
| 2018/0027386 A1* | 1/2018 | Zampini, II | | H04W 4/043 |
| | | | | 370/311 |
| 2018/0313932 A1* | 11/2018 | Niewczas | | G01S 5/14 |

FOREIGN PATENT DOCUMENTS

| | | |
|---|---|---|
| JP | 2015-025810 A | 2/2015 |
| JP | 2015-200609 A | 11/2015 |
| JP | 2016-111436 A | 6/2016 |

OTHER PUBLICATIONS

Jun. 9, 2020 Office Action issued in Chinese Patent Application No. 201710251248.9.

* cited by examiner

FIG. 4

| REGION ID | COMMUNICATION STATE | USE | STATE ||
|---|---|---|---|---|
| | | | STATIONARY | MOVING |
| $E_1$ | HIGH | MEETING ROOM (STAYING) | LONG | MEDIUM |
| $E_2$ | MEDIUM | MEETING ROOM (STAYING) | LONG | MEDIUM |
| ⋮ | ⋮ | ⋮ | ⋮ | ⋮ |
| $E_5$ | HIGH | ELEVATOR (MOVING) | LONG | MEDIUM |
| $E_6$ | MEDIUM | CORRIDOR (MOVING) | MEDIUM | SHORT |
| $E_7$ | LOW | CORRIDOR (MOVING) | SHORT | SHORT |
| ⋮ | ⋮ | ⋮ | ⋮ | ⋮ |
| $E_{15}$ | LOW | STAIRCASE (MOVING) | SHORT | SHORT |
| $E_{16}$ | LOW | WORK SPACE (STAYING) | MEDIUM | SHORT |
| ⋮ | ⋮ | ⋮ | ⋮ | ⋮ |

| TARGET | TIME INTERVAL |
|---|---|
| ACQUISITION TIME INTERVAL AT WHICH ACCELERATIONS ARE ACQUIRED | SHORT |
| RECEPTION INTERVAL AT WHICH BEACON SIGNAL IS RECEIVED | SHORT |
| TRANSMISSION INTERVAL AT WHICH BEACON INFORMATION IS TRANSMITTED | SHORT |
| TRANSMISSION INTERVAL AT WHICH POSITION INFORMATION REQUEST SIGNAL IS TRANSMITTED | SHORT |

| TARGET | TIME INTERVAL |
|---|---|
| ACQUISITION TIME INTERVAL AT WHICH ACCELERATIONS ARE ACQUIRED | MEDIUM |
| RECEPTION INTERVAL AT WHICH BEACON SIGNAL IS RECEIVED | SHORT |
| TRANSMISSION INTERVAL AT WHICH BEACON INFORMATION IS TRANSMITTED | SHORT |
| TRANSMISSION INTERVAL AT WHICH POSITION INFORMATION REQUEST SIGNAL IS TRANSMITTED | MEDIUM |

| TARGET | TIME INTERVAL |
|---|---|
| ACQUISITION TIME INTERVAL AT WHICH ACCELERATIONS ARE ACQUIRED | LONG |
| RECEPTION INTERVAL AT WHICH BEACON SIGNAL IS RECEIVED | MEDIUM |
| TRANSMISSION INTERVAL AT WHICH BEACON INFORMATION IS TRANSMITTED | MEDIUM |
| TRANSMISSION INTERVAL AT WHICH POSITION INFORMATION REQUEST SIGNAL IS TRANSMITTED | LONG |

INFORMATION PROCESSING APPARATUS AND NON-TRANSITORY COMPUTER READABLE MEDIUM FOR RECEIVING BEACON SIGNALS AND POSITION INFORMATION

CROSS-REFERENCE TO RELATED APPLICATIONS

This application is based on and claims priority under 35 USC 119 from Japanese Patent Application No. 2016-155906 filed Aug. 8, 2016.

BACKGROUND

Technical Field

The present invention relates to an information processing apparatus and a non-transitory computer readable medium for receiving beacon signals from one or more beacon transmitters and for receiving position information from an external device.

SUMMARY

According to an aspect of the invention, there is provided an information processing apparatus including an acquisition unit, a memory, and a setting unit. The acquisition unit acquires position information indicating a position of the information processing apparatus by performing communication with an external apparatus at a set time interval. The memory stores information about time intervals for respective regions. The setting unit changes and sets the time interval at which the acquisition unit performs communication to a time interval among the time intervals that is acquired by referring to content of the memory and that corresponds to a region corresponding to the position information among the regions.

BRIEF DESCRIPTION OF THE DRAWINGS

Exemplary embodiments of the present invention will be described in detail based on the following figures, wherein:

FIG. 4 is a diagram illustrating an example of time interval information;

FIGS. 5A to 5C are diagrams illustrating examples of set information;

DETAILED DESCRIPTION

Figure 1:
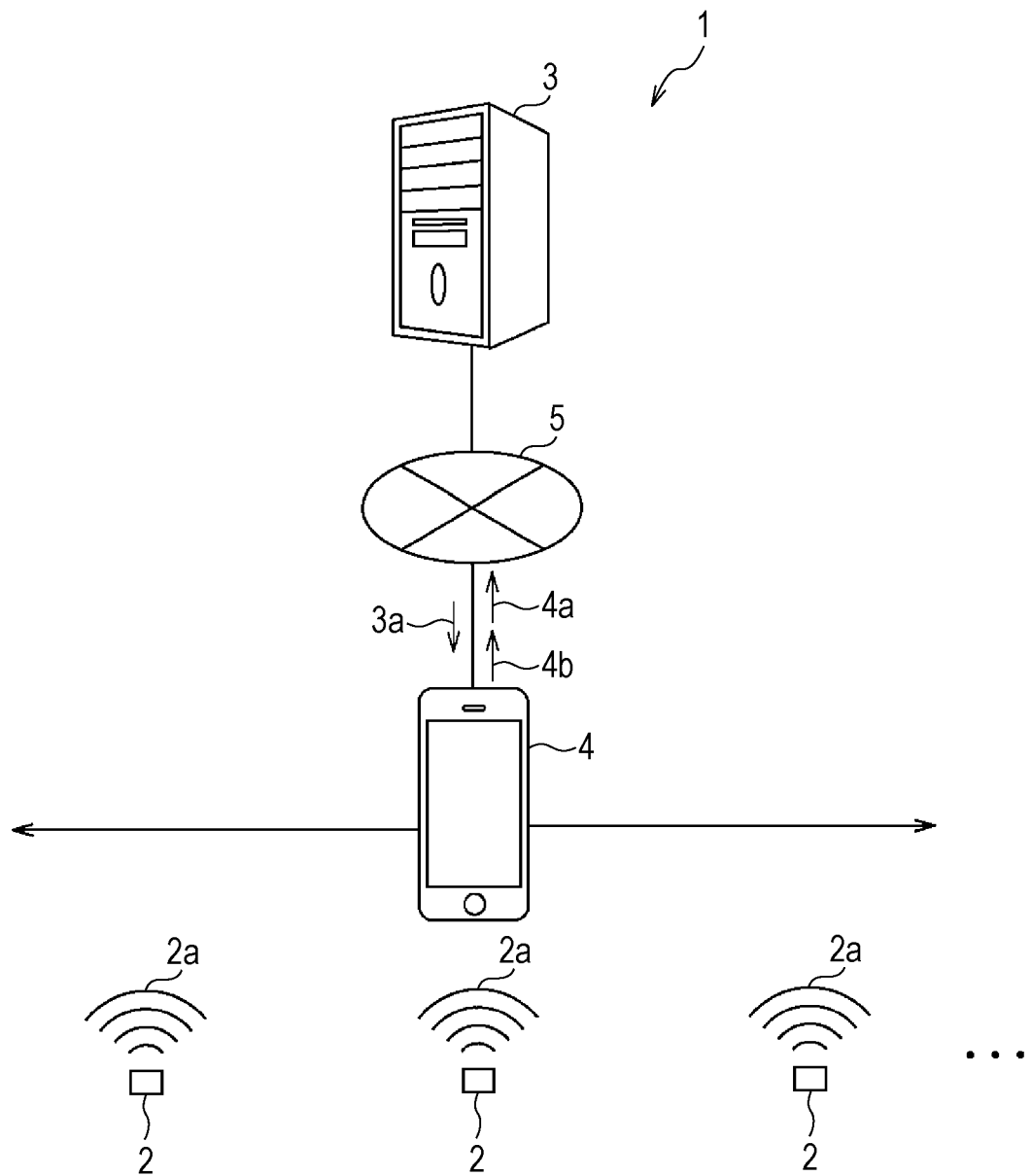
FIG. 1 is a diagram illustrating an example configuration of an information management system according to a first exemplary embodiment of the present invention.

Hereinafter, exemplary embodiments of the present invention will be described with reference to the drawings. In the drawings, constituent elements having substantially the same functions are assigned the same reference numerals, and duplicated description thereof is omitted.

First Exemplary Embodiment

FIG. 1 is a diagram illustrating an example configuration of an information management system 1 according to a first exemplary embodiment of the present invention.

The information management system 1 includes plural beacon transmitters 2, a server apparatus 3, and plural user terminal apparatuses 4 (one of the plural user terminal apparatuses 4 is illustrated in FIG. 1). The beacon transmitters 2 are installed in respective regions and each transmit a beacon signal 2a. The server apparatus 3 collects information about the positions of the user terminal apparatuses 4. Each of the user terminal apparatuses 4 receives the beacon signal 2a transmitted from any of the beacon transmitters 2 and further communicates with the server apparatus 3 over a network 5. The server apparatus 3 is an example of an external apparatus. The user terminal apparatus 4 is an example of an information processing apparatus.

Each of the beacon transmitters 2 successively transmits the beacon signal 2a that includes a device ID for identifying itself at intervals of, for example, about one second. As the beacon signal 2a, a signal compliant with the Bluetooth Low Energy (Bluetooth is a registered trademark) standard or the Wi-Fi (Wireless Fidelity) standard may be used. One beacon transmitter 2 is installed in each region, and the regions are set in areas, such as rooms, a corridor, an elevator, a staircase, and so on in a management area of an office, for example. In one area, one region may be set or plural regions may be set. A radio wave from a global positioning system (GPS) satellite does not reach the inside of a building or an underground location; however, if the beacon signal 2a is transmitted from any of the beacon transmitters 2 that is installed outdoor or underground, it is possible to identify an indoor position or an underground position with an accuracy of several centimeters to several meters.

When the server apparatus 3 receives beacon information 4a transmitted from the user terminal apparatus 4 and further receives a position information request signal 4b from the user terminal apparatus 4, the server apparatus 3 transmits to the user terminal apparatus 4 position information 3a that indicates the position of the user terminal apparatus 4.

The user terminal apparatus 4 is a mobile communication terminal carried by a user and may be a personal computer, a tablet computer, a multifunctional phone (smartphone), or a portable phone, for example. The user terminal apparatus 4 receives the beacon signal 2a at a set reception interval and transmits the beacon information 4a that includes a device ID included in the received beacon signal 2a and the signal strength of the received beacon signal 2a to the server apparatus 3 at a set transmission interval in response to reception of the beacon signal 2a. The user terminal apparatus 4 transmits the position information request signal 4b to the server apparatus 3 at a set transmission interval. The user terminal apparatus 4 acquires, at a set acquisition interval, accelerations experienced by the user terminal apparatus 4. As in iBeacon (registered trademark), information about the distance from the beacon transmitter 2 involved (for example, far, close, or very close) may be used instead of the signal strength of the beacon signal 2a.

The network 5 is a communication network, such as a local area network (LAN) or the Internet, over which data is transmitted and received via, for example, wireless communication and wired communication.

Configuration of Server Apparatus

Figure 2:
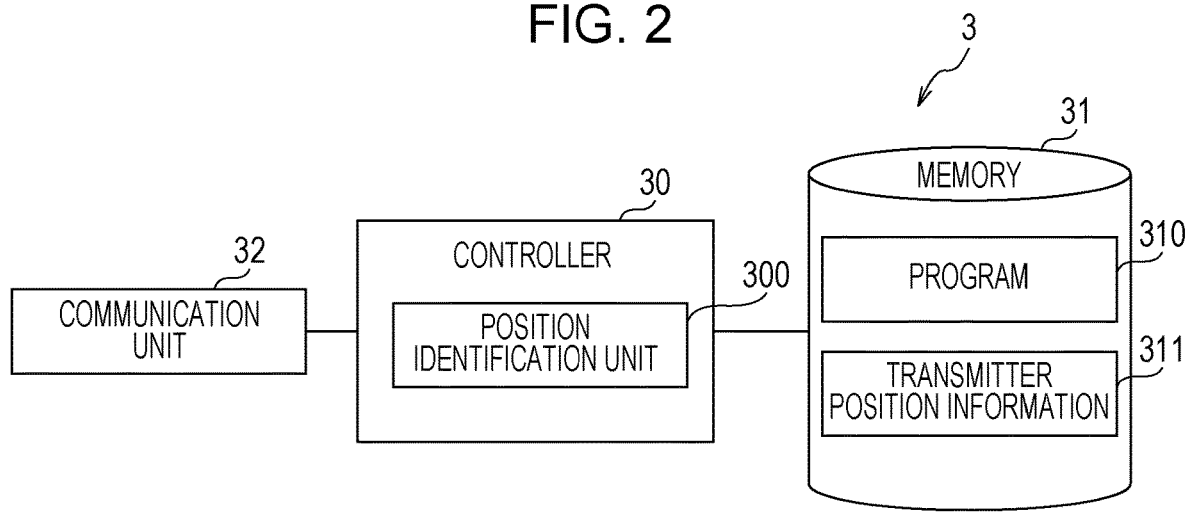
FIG. 2 is a block diagram illustrating an example control system of a server apparatus.

FIG. 2 is a block diagram illustrating an example control system of the server apparatus 3. The server apparatus 3 includes a controller 30 that controls each unit of the server apparatus 3, a memory 31 that stores various types of information, and a communication unit 32 that performs communication with the user terminal apparatus 4 over the network 5.

The memory 31 is implemented by using a read-only memory (ROM), a random access memory (RAM), and so on and stores a program 310, transmitter position information 311, and so on.

The transmitter position information 311 is information in which identification information (hereinafter also referred to as "region ID") of each region in which a corresponding one of the beacon transmitters 2 is installed is associated with the device ID of the beacon transmitter 2.

The controller 30 is constituted by a central processing unit (CPU), an interface, and so on. The CPU operates in accordance with the program 310 stored in the memory 31 to thereby function as a position identification unit 300, for example.

In response to reception of the position information request signal 4b from the user terminal apparatus 4, the position identification unit 300 identifies the position at which the user terminal apparatus 4 is present, that is, a region in which the beacon transmitter 2 involved is installed, for example, on the basis of the beacon information 4a transmitted from the user terminal apparatus 4. Specifically, the position identification unit 300 extracts, from the transmitter position information 311 stored in the memory 31, a region ID that corresponds to a device ID included in the beacon information 4a transmitted last from the user terminal apparatus 4, and transmits the extracted region ID to the user terminal apparatus 4 as the position information 3a. In a case where plural pieces of beacon information 4a are received at the same time, the position identification unit 300 identifies, on the basis of a piece of beacon information 4a that includes the highest signal strength among the received plural pieces of beacon information 4a, a region in which the beacon transmitter 2 involved is installed. The region ID is an example of position information. The position information may be longitude and latitude information.

Configuration of User Terminal Apparatus

Figure 3:
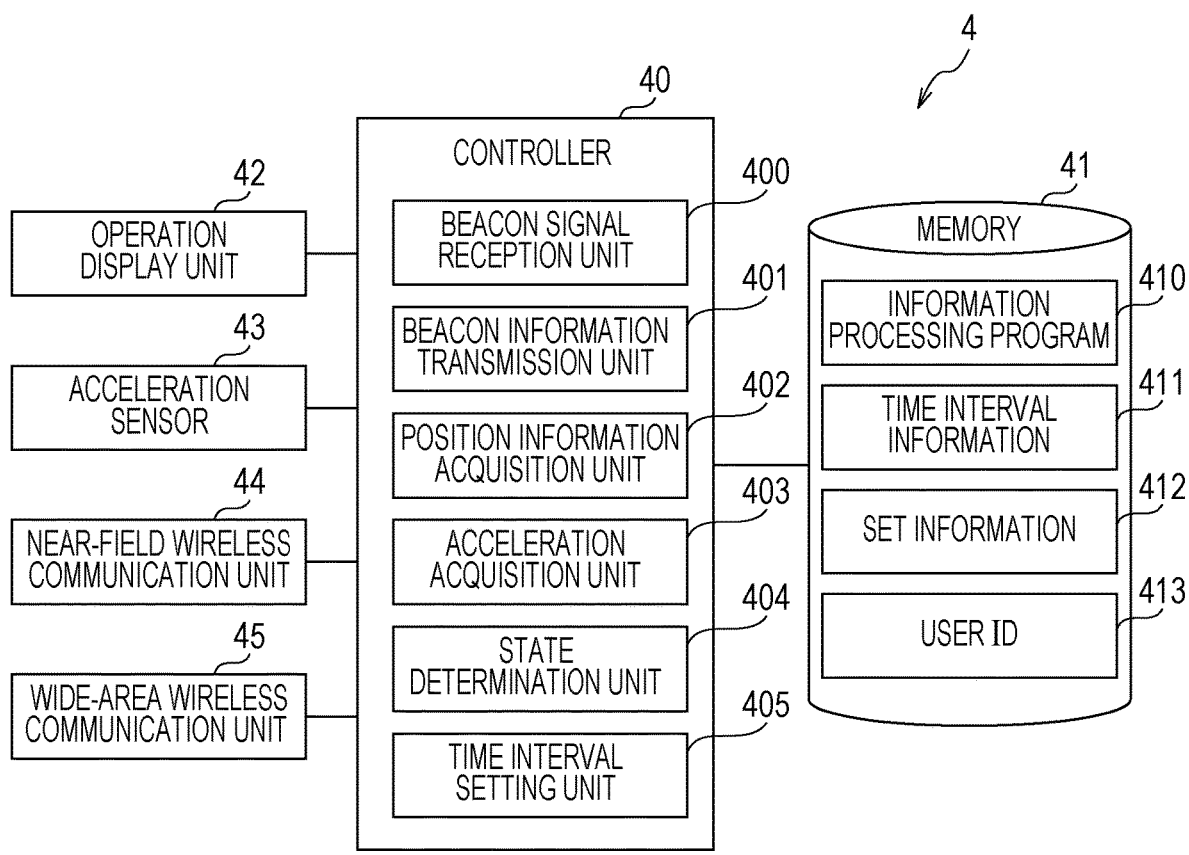
FIG. 3 is a block diagram illustrating an example control system of a user terminal apparatus.

FIG. 3 is a block diagram illustrating an example control system of the user terminal apparatus 4. The user terminal apparatus 4 includes a controller 40, a memory 41, an operation display unit 42, an acceleration sensor 43, a near-field wireless communication unit 44, and a wide-area wireless communication unit 45. The controller 40 controls each unit of the user terminal apparatus 4. The memory 41 stores various types of information. The operation display unit 42 receives and displays information. The acceleration sensor 43 measures accelerations experienced by the user terminal apparatus 4. The near-field wireless communication unit 44 receives the beacon signal 2a transmitted from any of the beacon transmitters 2. The wide-area wireless communication unit 45 performs wireless communication with the server apparatus 3 over the network 5.

The memory 41 is implemented by using a ROM, a RAM, and so on and stores an information processing program 410, time interval information 411, set information 412, a user ID 413, and so on.

The time interval information 411 is information that includes a time interval to be set for each region ID on the basis of the state of the user terminal apparatus 4 (a moving state or a stationary state). The state of the user terminal apparatus 4 is an example of information about movement of the user terminal apparatus 4.

The set information 412 includes information about time intervals that are respectively set for control targets, namely, an acquisition interval at which the accelerations are acquired, a reception interval at which the beacon signal 2a is received, a transmission interval at which the beacon information 4a is transmitted, and a transmission interval at which the position information request signal 4b is transmitted.

The user ID 413 is identification information of a user that carries the user terminal apparatus 4. An apparatus ID specific to the user terminal apparatus 4 may be used instead of the user ID 413.

The operation display unit 42 includes a touch panel display formed by stacking a touch panel on a display, such as a liquid crystal display, displays an operation screen on the display, and receives an operation performed by an operator on the touch panel.

The acceleration sensor 43 is, for example, a three-axis acceleration sensor capable of measuring accelerations experienced by the user terminal apparatus 4 in the directions of three axes. The acceleration sensor 43 measures an acceleration in a direction perpendicular to the screen of the operation display unit 42, an acceleration in a direction parallel to the lateral direction of the screen of the operation display unit 42, and an acceleration in a direction parallel to the longitudinal direction of the screen of the operation display unit 42.

The near-field wireless communication unit 44 performs wireless communication using, for example, Bluetooth (registered trademark) or Wi-Fi. The wide-area wireless communication unit 45 performs wireless communication using, for example, a wireless LAN based on Wi-Fi, or Long Term Evolution (LTE).

The controller 40 is constituted by a CPU, an interface, and so on. The CPU operates in accordance with the information processing program 410 stored in the memory 41 to thereby function as a beacon signal reception unit 400, a beacon information transmission unit 401, a position information acquisition unit 402, an acceleration acquisition unit 403, a state determination unit 404, and a time interval setting unit 405, for example.

The beacon signal reception unit 400 receives the beacon signal 2a transmitted from any of the beacon transmitters 2 at the reception interval that is set in the set information 412, and detects the signal strength of the received beacon signal 2a.

The beacon information transmission unit 401 transmits to the server apparatus 3 the beacon information 4a at the transmission interval that is set in the set information 412, the beacon information 4a including a device ID included in the beacon signal 2a received by the beacon signal reception unit 400 and the signal strength of the beacon signal 2a detected by the beacon signal reception unit 400.

The position information acquisition unit 402 acquires the position information 3a that indicates the position of the user terminal apparatus 4 by communicating with an external apparatus at a set time interval. That is, the position information acquisition unit 402 transmits the position information request signal 4b to the server apparatus 3 at the transmission interval that is set in the set information 412, and acquires the position information 3a transmitted from the server apparatus 3 in response to the position information request signal 4b.

The acceleration acquisition unit 403 acquires accelerations in the directions of three axes from the acceleration sensor 43 at the acquisition interval that is set in the set information 412.

The state determination unit 404 compares the largest acceleration among the accelerations in the directions of three axes acquired by the acceleration acquisition unit 403 with a threshold. If the largest acceleration is equal to or larger than the threshold, the state determination unit 404 determines that the user terminal apparatus 4 is in the moving state (the user is moving). If the largest acceleration is smaller than the threshold, the state determination unit 404 determines that the user terminal apparatus 4 is in the stationary state (the user stays stationary).

The time interval setting unit 405 sets, on the basis of a region ID included in the position information 3a acquired by the position information acquisition unit 402 and the state (the moving state or the stationary state) of the user terminal apparatus 4 determined by the state determination unit 404, the reception interval at which the beacon signal reception unit 400 receives the beacon signal 2a, the transmission interval at which the beacon information transmission unit 401 transmits the beacon information 4a, the transmission interval at which the position information acquisition unit 402 transmits the position information request signal 4b, and the acquisition interval at which the acceleration acquisition unit 403 acquires the accelerations by referring to the time interval information 411 stored in the memory 41 and changing these intervals to time intervals that correspond to the region ID and the state of the user terminal apparatus 4. The reception interval, the transmission intervals, and the acquisition interval are examples of time intervals.

FIG. 4 is a diagram illustrating an example of the time interval information 411 stored in the memory 41 of the user terminal apparatus 4. The time interval information 411 illustrated in FIG. 4 is information related to, for example, the acquisition interval at which the accelerations are acquired and the transmission interval at which the position information request signal 4b is transmitted. The time interval information 411 is also set for each of the other control targets, namely, the reception interval at which the beacon signal 2a is received and the transmission interval at which the beacon information 4a is transmitted. The time interval information 411 may be set as common time interval information for the control targets, namely, the acquisition interval at which the accelerations are acquired, the reception interval at which the beacon signal 2a is received, the transmission interval at which the beacon information 4a is transmitted, and the transmission interval at which the position information request signal 4b is transmitted. The time interval information 411 illustrated in FIG. 4 may be set as common time interval information for the control targets, and a value corresponding to "long", "medium", or "short" described below, which indicates a time interval, may be set for each control target. The time interval information 411 has a region ID field 411a, a communication state field 411b, a use field 411c, and a state field 411d.

In the region ID field 411a, region IDs $E_1$, $E_2$, and so on that respectively indicate the regions in which the beacon transmitters 2 are installed are registered.

In the communication state field 411b, the communication states of "high", "medium", and "low", which indicate the stability of communication, are registered. The communication state "high" indicates that the stability of communication is high because, for example, a wall surrounds the region and the beacon signal 2a interferes with others to a small degree. The communication state "low" indicates that the stability of communication is low because, for example, no wall surrounds the region and the beacon signal 2a interferes with others to a large degree. The communication state "medium" is a medium communication state between "high" and "low".

In the use field 411c, the use of each region is registered. The characteristic "staying" means that a user tends to stay in the region. The characteristic "moving" means that a user tends to move through the region. The information about the communication state and the use is an example of information about the attributes of each region.

In the state field 411d, "stationary" means that the user terminal apparatus 4 is in the stationary state, and "moving" means that the user terminal apparatus 4 is in the moving state. In the state field 411d, "long", which means a long time interval value, "short", which means a short time interval value, and "medium", which means a medium time interval value between "long" and "short", are registered. Specifically, "short", "medium", and "long" respectively mean values of, for example, one second, 10 seconds, and 30 seconds.

Operation of Information Management System

Now, an example operation of the information management system 1 is described with reference to FIG. 4 to FIG. 7. FIG. 7 is a flowchart illustrating an example operation of the user terminal apparatus 4.

FIGS. 5A to 5C are diagrams illustrating examples of the set information 412. It is assumed that the set information 412 illustrated in FIG. 5A is stored in the memory 41 of the user terminal apparatus 4 at the time when the information processing program 410 of the user terminal apparatus 4 is started. That is, it is assumed that the acquisition time interval at which the accelerations are acquired is set to "short", the reception interval at which the beacon signal 2a is received is set to "short", the transmission interval at which the beacon information 4a is transmitted is set to "short", and the transmission interval at which the position information request signal 4b is transmitted is set to "short" at the time when the information processing program 410 of the user terminal apparatus 4 is started.

Figure 6:
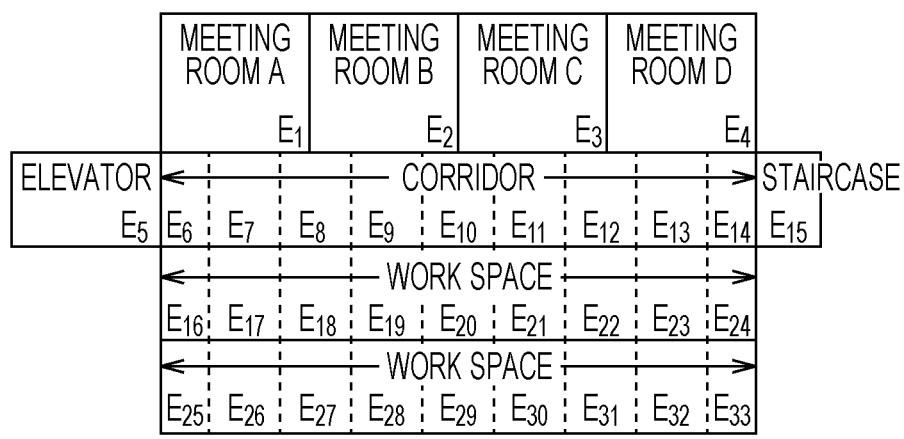
FIG. 6 is a diagram illustrating an example management area of an office.
Figure 7:
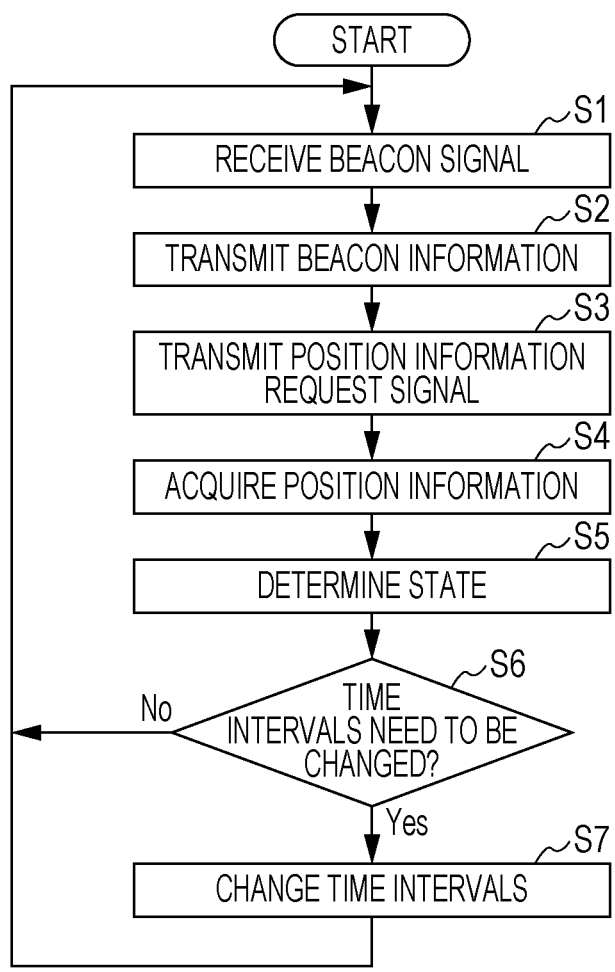
FIG. 7 is a flowchart illustrating an example operation of the user terminal apparatus.

FIG. 6 is a diagram illustrating an example management area of an office. The management area illustrated in FIG. 6 includes meeting rooms A to D, an elevator, a corridor, a staircase, and a work space in each of which one or more regions are set. In each of the corridor area and in the work space area, plural regions are set. In FIG. 6, $E_1$ to $E_{33}$ are example region IDs. In each of the regions respectively having the region IDs $E_1$ to $E_{33}$ illustrated in FIG. 6, one beacon transmitter 2 is installed, although the beacon transmitters 2 are not illustrated in FIG. 6.

A case is described where a user carrying the user terminal apparatus 4 moves from the region $E_{33}$ in the work space to the meeting room A indicated by $E_1$ illustrated in FIG. 6. It is assumed that the time interval information 411 illustrated in FIG. 4 is set for each of the control targets, namely, the acquisition interval at which the accelerations are acquired, the reception interval at which the beacon signal 2a is received, the transmission interval at which the beacon information 4a is transmitted, and the transmission interval at which the position information request signal 4b is transmitted.

(1) Reception of Beacon Signal and Transmission of Beacon Information

The beacon signal reception unit 400 receives the beacon signal 2a transmitted from any of the beacon transmitters 2 at the set reception interval (for example, one second) via the near-field wireless communication unit 44 and detects the signal strength of the received beacon signal 2a (step S1).

The beacon information transmission unit 401 transmits, to the server apparatus 3 over the network 5, the beacon information 4a together with the user ID 413 at the set transmission interval (for example, one second) via the wide-area wireless communication unit 45, the beacon information 4a including a device ID included in the beacon signal 2a received by the beacon signal reception unit 400 and the signal strength of the beacon signal 2a detected by the beacon signal reception unit 400 (step S2).

(2) Acquisition of Position Information

The position information acquisition unit 402 transmits, to the server apparatus 3 over the network 5, the position information request signal 4b together with the user ID 413 at the set transmission interval (for example, one second) via the wide-area wireless communication unit 45 (step S3).

In response to reception of the position information request signal 4b, the position identification unit 300 of the server apparatus 3 identifies the position of the user terminal apparatus 4 on the basis of the device ID and the signal strength of the beacon signal 2a that are included in the last one of the pieces of beacon information 4a transmitted from the user terminal apparatus 4 having the same user ID 413. Specifically, a region ID corresponding to the device ID included in the beacon information 4a is extracted from the transmitter position information 311 stored in the memory 31, and the extracted region ID is transmitted to the user terminal apparatus 4 as the position information 3a. The position information acquisition unit 402 of the user terminal apparatus 4 acquires the position information 3a transmitted from the server apparatus 3 (step S4). The position information acquisition unit 402 temporarily stores the acquired position information 3a in the memory 41.

(3) Acquisition of Accelerations

The acceleration acquisition unit 403 acquires accelerations in the directions of three axes from the acceleration sensor 43 at the set acquisition interval (for example, one second). The acceleration acquisition unit 403 temporarily stores the acquired accelerations in the memory 41. The state determination unit 404 compares the largest acceleration among the accelerations in the directions of three axes acquired by the acceleration acquisition unit 403 and temporarily stored in the memory 41 with a threshold. The state determination unit 404 determines that the user terminal apparatus 4 is in the moving state if the largest acceleration is equal to or larger than the threshold and determines that the user terminal apparatus 4 is in the stationary state if the largest acceleration is smaller than the threshold (step S5).

(4) Setting of Time Intervals

The time interval setting unit 405 refers to the time interval information 411 and determines whether the time intervals in the set information 412 stored in the memory 41 need to be changed on the basis of the position information 3a acquired by the position information acquisition unit 402 and the state of the user terminal apparatus 4 determined by the state determination unit 404 (step S6). If it is determined that the time intervals need to be changed (Yes in step S6), the time interval setting unit 405 changes and sets the time intervals in the set information 412 stored in the memory 41 (step S7).

For example, immediately after the user has arrived at the meeting room A having the region ID $E_1$ illustrated in FIG. 6, the user is still moving inside the meeting room A, and therefore, the user terminal apparatus 4 is in the moving state. Accordingly, the acquisition interval at which the accelerations are acquired and the transmission interval at which the position information request signal 4b is transmitted are to be set to "medium", as illustrated in FIG. 4. In this case, the time interval setting unit 405 changes and sets the acquisition interval at which the accelerations are acquired to "medium", and changes and sets the transmission interval at which the position information request signal 4b is transmitted to "medium", for example, as illustrated in FIG. 5B. The reception interval at which the beacon signal 2a is received and the transmission interval at which the beacon information 4a is transmitted remain unchanged and are "short".

After the user have taken a seat in the meeting room A having the region ID $E_1$ illustrated in FIG. 6, the user stays stationary, and therefore, the user terminal apparatus 4 is in the stationary state. Accordingly, the acquisition interval at which the accelerations are acquired and the transmission interval at which the position information request signal 4b is transmitted are to be set to "long", as illustrated in FIG. 4. In this case, the time interval setting unit 405 changes and sets the acquisition interval at which the accelerations are acquired to "long", the reception interval at which the beacon signal 2a is received to "medium", the transmission interval at which the beacon information 4a is transmitted to "medium", and the transmission interval at which the position information request signal 4b is transmitted to "long", for example, as illustrated in FIG. 5C.

Second Exemplary Embodiment

Figure 8:
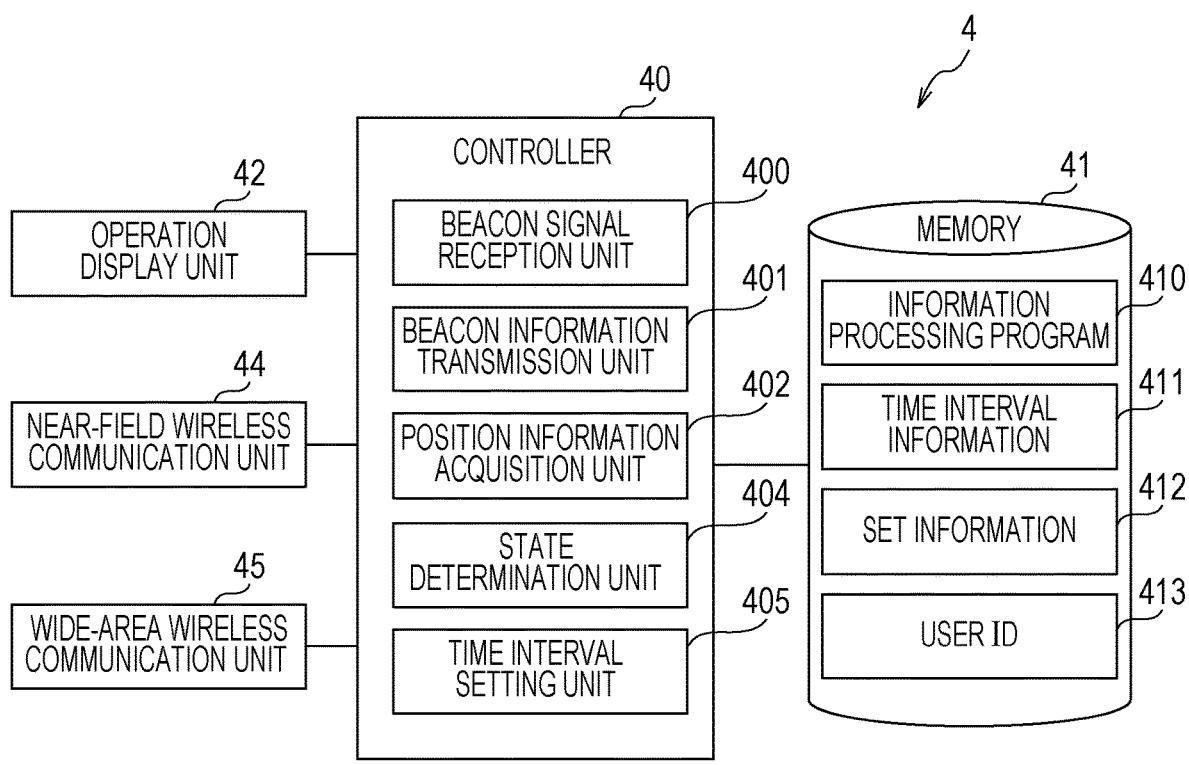
FIG. 8 is a block diagram illustrating an example control system of the user terminal apparatus according to a second exemplary embodiment of the present invention.

FIG. 8 is a block diagram illustrating an example control system of the user terminal apparatus 4 according to a second exemplary embodiment of the present invention. In the first exemplary embodiment, the acceleration acquisition unit 403 acquires the accelerations measured by the acceleration sensor 43, and the state determination unit 404 determines the state of the user terminal apparatus 4 on the basis of the acquired accelerations. In this exemplary embodiment, the state of the user terminal apparatus 4 is determined without using the acceleration sensor 43 and the acceleration acquisition unit 403, and the rest of the configuration is similar to that in the first exemplary embodiment. Hereinafter, the difference from the first exemplary embodiment is described.

In response to repeated reception of the position information 3a from the server apparatus 3, the state determination unit 404 according to this exemplary embodiment calculates the speed of the user terminal apparatus 4 from a change in the position of the user terminal apparatus 4 (the position at which the beacon transmitter 2 involved is installed) per unit time indicated by two pieces of position information 3a, and compares the calculated speed with a threshold. If the speed is equal to or larger than the threshold, the state determination unit 404 determines that the user terminal apparatus 4 is in the moving state. If the speed is smaller than the threshold, the state determination unit 404 determines that the user terminal apparatus 4 is in the stationary state.

Third Exemplary Embodiment

Figure 9:
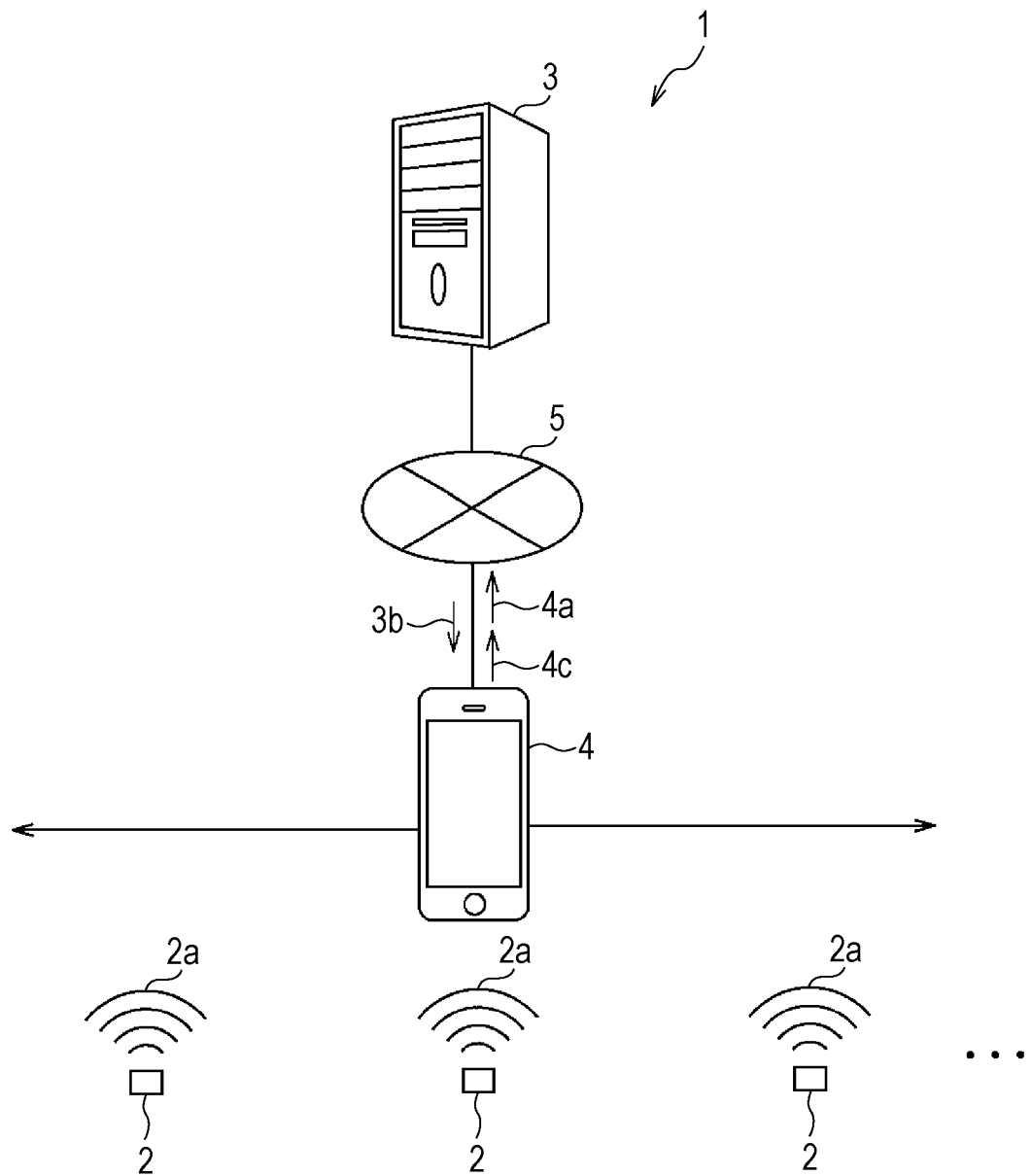
FIG. 9 is a diagram illustrating an example configuration of the information management system according to a third exemplary embodiment of the present invention.

FIG. 9 is a diagram illustrating an example configuration of the information management system 1 according to a third exemplary embodiment of the present invention. In the first exemplary embodiment, the time intervals are determined by the user terminal apparatus 4. In this exemplary embodiment, the time intervals are determined by the server apparatus 3, and the rest of the configuration is similar to that in the first exemplary embodiment. Hereinafter, the difference from the first exemplary embodiment is described.

The information management system 1 according to this exemplary embodiment includes the plural beacon transmitters 2 installed in the respective regions, the server apparatus 3, and the plural user terminal apparatuses 4 that communicate with the server apparatus 3 over the network 5, as in the first exemplary embodiment. One of the plural user terminal apparatuses 4 is illustrated in FIG. 9.

The user terminal apparatus 4 receives the beacon signal 2a at the set reception interval and transmits the beacon information 4a that includes a device ID included in the received beacon signal 2a and the signal strength of the received beacon signal 2a to the server apparatus 3 at the set transmission interval in response to reception of the beacon signal 2a. The user terminal apparatus 4 transmits a change information request signal 4c to the server apparatus 3 at a set transmission interval. In this exemplary embodiment, the user terminal apparatus 4 does not transmit the position information request signal 4b to the server apparatus 3.

When the server apparatus 3 receives the beacon information 4a transmitted from the user terminal apparatus 4 and further receives the change information request signal 4c from the user terminal apparatus 4, the server apparatus 3 transmits change information 3b to the user terminal apparatus 4. The change information 3b includes information about, for example, whether the reception interval at which the beacon signal 2a is received, the transmission interval at which the beacon information 4a is transmitted, and the transmission interval at which the change information request signal 4c is transmitted are to be changed to "short", "medium", or "long".

Configuration of Server Apparatus

Figure 10:
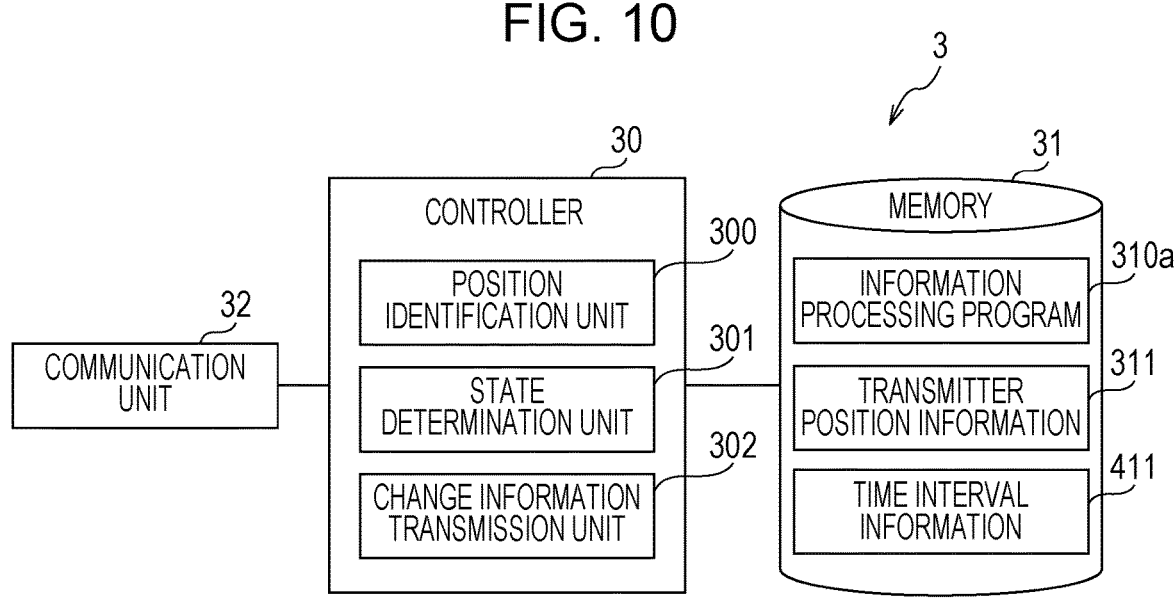
FIG. 10 is a block diagram illustrating an example control system of the server apparatus according to the third exemplary embodiment.

FIG. 10 is a block diagram illustrating an example control system of the server apparatus 3 according to the third exemplary embodiment. The server apparatus 3 includes the controller 30, the memory 31, and the communication unit 32 as in the first exemplary embodiment.

The memory 31 is implemented by using a ROM, a RAM, and so on and stores the time interval information 411 illustrated in FIG. 4 and so on in addition to an information processing program 310a and the transmitter position information 311.

The CPU of the controller 30 operates in accordance with the information processing program 310a stored in the memory 31 to thereby function as the position identification unit 300, a state determination unit 301, and a change information transmission unit 302, for example.

The position identification unit 300 identifies the position at which the user terminal apparatus 4 is present, that is, a region in which the beacon transmitter 2 involved is installed, on the basis of the beacon information 4a transmitted from the user terminal apparatus 4.

The state determination unit 301 calculates the speed of the user terminal apparatus 4a from a change in the position of the user terminal apparatus 4 per unit time identified by the position identification unit 300. If the speed is equal to or larger than a threshold, the state determination unit 301 determines that the user terminal apparatus 4 is in the moving state. If the speed is smaller than the threshold, the state determination unit 301 determines that the user terminal apparatus 4 is in the stationary state.

The change information transmission unit 302 refers to the time interval information 411 on the basis of the position identified by the position identification unit 300 and the state of the user terminal apparatus 4 determined by the state determination unit 301, acquires information about time intervals to be changed, and transmits the acquired information to the user terminal apparatus 4 as the change information 3b.

Configuration of User Terminal Apparatus

Figure 11:
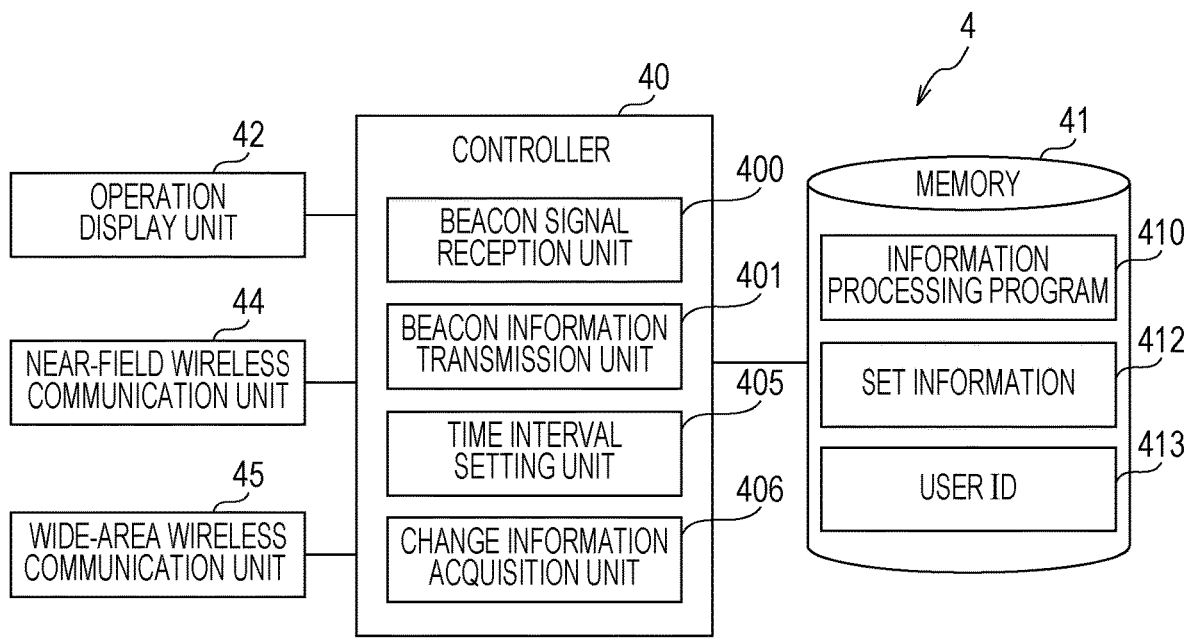
FIG. 11 is a block diagram illustrating an example control system of the user terminal apparatus according to the third exemplary embodiment.

FIG. 11 is a block diagram illustrating an example control system of the user terminal apparatus 4 according to the third exemplary embodiment. The user terminal apparatus 4 includes the controller 40, the memory 41, the operation display unit 42, the near-field wireless communication unit 44, and the wide-area wireless communication unit 45 as in the first exemplary embodiment but does not include the acceleration sensor 43.

The memory 41 stores the information processing program 410, the set information 412, the user ID 413, and so on, but does not store the time interval information 411.

The CPU of the controller 40 operates in accordance with the information processing program 410 stored in the memory 41 to thereby function as the beacon signal reception unit 400, the beacon information transmission unit 401, a change information acquisition unit 406, and the time interval setting unit 405, for example. The controller 40 according to this exemplary embodiment does not function as the position information acquisition unit 402, the acceleration acquisition unit 403, and the state determination unit 404.

The change information acquisition unit 406 acquires the change information 3b transmitted from the server apparatus 3.

The time interval setting unit 405 changes and sets, on the basis of the change information 3b acquired by the change information acquisition unit 406, the reception interval at which the beacon signal reception unit 400 receives the beacon signal 2a, the transmission interval at which the beacon information transmission unit 401 transmits the beacon information 4a, or the transmission interval at which the change information request signal 4c is transmitted.

Modifications

Although exemplary embodiments of the present invention have been described above, the present invention is not limited to the above-described exemplary embodiments, and various modifications and implementations may be made without departing from the spirit of the present invention. In the first and second exemplary embodiments, the beacon information 4a and the position information request signal 4b are separately transmitted from the user terminal apparatus 4 to the server apparatus 3; however, for example, a position information request signal that includes a device ID and the signal strength may be transmitted to the server apparatus 3. Similarly, in the third exemplary embodiment, the beacon information 4a and the change information request signal 4c are separately transmitted from the user terminal apparatus 4 to the server apparatus 3; however, a change information request signal that includes a device ID and the signal strength may be transmitted to the server apparatus 3.

In the above-described exemplary embodiments, the user terminal apparatus carried by a user has been described as the information processing apparatus; however, the information processing apparatus may be a terminal apparatus mounted in a transport vehicle, such as a cart, used to transport loads or in a mobile apparatus provided with driving force. In this case, the operation display unit 42 need not be provided.

Further, some constituent elements may be omitted or any constituent element of any exemplary embodiment may be combined with any constituent element of the other exemplary embodiments without departing from the spirit of the present invention. For example, the time intervals may be set on the basis of the attributes (information about the communication state, the use, and so on) of a region in which the beacon transmitter 2 involved is installed without determining the state of the user terminal apparatus 4.

Further, any step may be added, deleted, changed, or replaced, for example, in the flows in the exemplary embodiments without departing from the spirit of the present invention. For example, in the flowchart illustrated in FIG. 7, state determination (step S5) may be performed parallel to position information acquisition (step S4) or prior to position information acquisition (step S4).

Some or all of the units of the controller 30 and some or all of the units of the controller 40 may be configured as a reconfigurable circuit, such as a field programmable gate array (FPGA), an application-specific integrated circuit (ASIC), or any other hardware circuit. The programs used in the above-described exemplary embodiments may be recorded to a computer-readable recording medium, such as a compact disc read-only memory (CD-ROM), and provided.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
  process an information for specifying a position of the information processing apparatus transmitted from a first external apparatus at a first time interval, the information being processed at a second time interval that is longer than the first time interval;
  transmit a request signal to a second external apparatus at a third time interval different from the second time interval, the request signal requesting position information of the information processing apparatus, the second external apparatus being different from the first external apparatus;
  receive the requested position information from the second external apparatus;
  adjust at least one of the first time interval, the second time interval, and the third time interval, with the proviso that
  when the second time interval increases, the third time interval also increases.

2. The information processing apparatus according to claim 1, wherein
the first time interval, the second time interval and the third time interval are set to be one of short, medium and long.

3. The information processing apparatus according to claim 1, wherein
the processor is programmed to:
  acquire, from a sensor, acceleration information of the information processing apparatus at a fourth time interval;
  based on (i) the position information received from the second external apparatus and (ii) the acceleration information acquired from the sensor, determine a moving state of the information processing apparatus; and
  based on the determined moving state, adjust at least one of the first time interval, the second time interval, the third time interval, and the fourth time interval, with the proviso that
  when the second time interval increases, the third time interval also increases.

* * * * *